(12) United States Patent
Min et al.

(10) Patent No.: US 8,531,116 B2
(45) Date of Patent: Sep. 10, 2013

(54) APPARATUS AND METHOD OF DRIVING LIGHT SOURCE

(75) Inventors: Byung-Sam Min, Gyeonggi-do (KR); Ja-Young Pyun, Seoul (KR)

(73) Assignee: LG Display Co., Ltd., Seoul (KR)

( * ) Notice: Subject to any disclaimer, the term of this patent is extended or adjusted under 35 U.S.C. 154(b) by 280 days.

(21) Appl. No.: 12/949,214

(22) Filed: Nov. 18, 2010

(65) Prior Publication Data

US 2011/0140615 A1  Jun. 16, 2011

(30) Foreign Application Priority Data

Dec. 11, 2009  (KR) .................. 10-2009-0123258

(51) Int. Cl.
  *H05B 37/02*  (2006.01)
(52) U.S. Cl.
  USPC ............... 315/185 R; 315/185 S; 315/297; 315/247; 315/307; 315/130; 315/291; 345/204; 345/211; 345/102; 345/694; 345/82
(58) Field of Classification Search
  USPC ............... 315/185 R, 185 S, 224, 247, 291, 315/307–326; 345/204, 211–214, 82, 83, 345/102
  See application file for complete search history.

(56) References Cited

U.S. PATENT DOCUMENTS

| | | | | |
|---|---|---|---|---|
| 6,724,158 B1 * | 4/2004 | Feldman | | 315/291 |
| 8,049,690 B2 * | 11/2011 | Wu et al. | | 345/82 |
| 8,054,307 B2 * | 11/2011 | Jang | | 345/213 |
| 8,120,273 B2 * | 2/2012 | Edwards | | 315/291 |
| 8,120,284 B2 * | 2/2012 | Chen et al. | | 315/307 |
| 8,129,918 B2 * | 3/2012 | Lee et al. | | 315/247 |
| 8,139,019 B2 * | 3/2012 | Han et al. | | 345/102 |
| 8,169,390 B2 * | 5/2012 | Kang et al. | | 345/87 |
| 2006/0038510 A1 | 2/2006 | Lee et al. | | |
| 2006/0291199 A1 | 12/2006 | Qian | | |
| 2008/0297058 A1 * | 12/2008 | Soos | | 315/185 R |
| 2009/0045759 A1 * | 2/2009 | Kang et al. | | 315/307 |
| 2009/0256499 A1 | 10/2009 | Lee et al. | | |
| 2010/0039456 A1 * | 2/2010 | Um et al. | | 345/694 |
| 2010/0052572 A1 * | 3/2010 | Kataoka et al. | | 315/297 |
| 2011/0050110 A1 * | 3/2011 | Han | | 315/185 R |
| 2011/0156593 A1 * | 6/2011 | De Greef et al. | | 315/130 |

FOREIGN PATENT DOCUMENTS

| | | |
|---|---|---|
| EP | 1484740 A2 * | 12/2004 |
| JP | 2007-507069 A | 3/2007 |
| KR | 10-2006-0017360 A | 2/2006 |
| WO | 2005/029454 A1 | 3/2005 |

OTHER PUBLICATIONS

Office Action and English translation dated Feb. 26, 2013 issued by the State Intellectual Property Office of China for counterpart Chinese Patent Application No. 201010265083.9.
KIPO—Office Action for Korean Patent Application No. 10-2009-0123258—Issued on Apr. 30, 2013.

* cited by examiner

*Primary Examiner* — Daniel Cavallari
*Assistant Examiner* — Srinivas Sathiraju
(74) *Attorney, Agent, or Firm* — Morgan, Lewis & Bockius LLP

(57) ABSTRACT

A light source driving apparatus for implementing general purpose driving of a high-current light emitting diode (LED) and a low-current LED, and a method for driving the same are disclosed. The apparatus for driving the light source includes a plurality of light emitting diode (LED) strings, and a light emitting diode (LED) driving circuit for driving the LED strings, and having a plurality of channels commonly connected to the same LED string.

5 Claims, 6 Drawing Sheets

APPARATUS AND METHOD OF DRIVING LIGHT SOURCE

This application claims the benefit of Korean Patent Application No. P2009-0123258, filed on Dec. 11, 2009, which is hereby incorporated by reference as if fully set forth herein.

BACKGROUND OF THE INVENTION

1. Field of the Invention

The present invention relates to a light source driving apparatus for implementing general purpose driving of a high-current light emitting diode (LED) and a low-current LED, and a method for driving the same.

2. Discussion of the Related Art

Generally, a liquid crystal display (LCD) is a representative example of flat panel displays capable of displaying an image using a liquid crystal. The LCD is thinner and lighter than other display devices, and also has a lower driving voltage and lower power consumption as compared to such display devices. Thus, LCDs have been widely used in the whole field of industries throughout the world.

The LCD is a non-emissive element because a liquid crystal panel for displaying an image does not self-emit light. Thus, the LCD requires a plurality of light source strings for providing light and a light source driver for driving the light source strings.

In a conventional light source driver, a maximum allowable current for each channel is limited. Therefore, the light source string connected to a corresponding channel has only to be driven by a current signal included in a maximum allowable current for each channel of the light source driver, such that it is impossible for the conventional light source driver to be driven by a high current signal.

SUMMARY OF THE INVENTION

Accordingly, the present invention is directed to an apparatus and method for driving a light source that substantially obviate one or more problems due to limitations and disadvantages of the related art.

An object of the present invention is to provide a light source driving apparatus for implementing general purpose driving of a high-current light emitting diode (LED) and a low-current LED, and a method for driving the same.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, an apparatus for driving a light source includes a plurality of light emitting diode (LED) strings, and a light emitting diode (LED) driving circuit for driving the LED strings, and having a plurality of channels commonly connected to the same LED string.

The LED driving circuit may include a pulse controller for generating a pulse signal to control luminosity of each of the LED strings, and a current controller which includes a plurality of channel switches to control a magnitude of a current signal provided to each of the LED strings.

The LED driving circuit may further include a current detector which is located between the pulse controller and the current controller, detects current values of pulse signals provided to the channel switches, and compares the detected current values with one another.

The pulse controller may control duty ratios of the channel switches when the current values detected by the current detector are different from one another, such that the same current value is provided to the LED string connected to the plurality of channels.

The LED driving circuit may further include a feedback controller for detecting an output current of the LED string, generating a first feedback control signal when the detected output current is equal to or less than a maximum allowable current of each channel, and generating a second feedback control signal when the detected output current is higher than the maximum allowable current of each channel.

The pulse controller may control a duty ratio of the channel switch in response to the first and second feedback control signals, such that the sum of maximum allowable currents of respective channels is identical to the detected current.

In another aspect of the present invention, there is provided a method for driving a light source including commonly connecting a plurality of channels of a light emitting diode (LED) driving circuit to each of light emitting diode (LED) strings, and driving the LED strings using the LED driving circuit.

The driving of the LED strings may include generating, by a pulse controller, a pulse signal for controlling luminosity of each LED string, and controlling, by a current controller comprised of a plurality of channel switches, a magnitude of a current provided to the LED strings in response to the pulse signal.

The method may further include detecting, by a current detector located between the pulse controller and the current controller, current values of pulse signals provided to the respective channel switches, and comparing the detected current values with one another, and controlling duty ratios of the channel switches when the current values detected by the current detector are different from one another, such that the same current value is provided to the LED string connected to the plurality of channels.

The method may further include detecting an output current of the LED string, generating a first feedback control signal when the detected output current is equal to or less than a maximum allowable current of each channel, and generating a second feedback control signal when the detected output current is higher than the maximum allowable current of each channel, and controlling duty ratios of the channel switches in response to the first and second feedback control signals, such that the sum of maximum allowable currents of respective channels is identical to the detected current.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
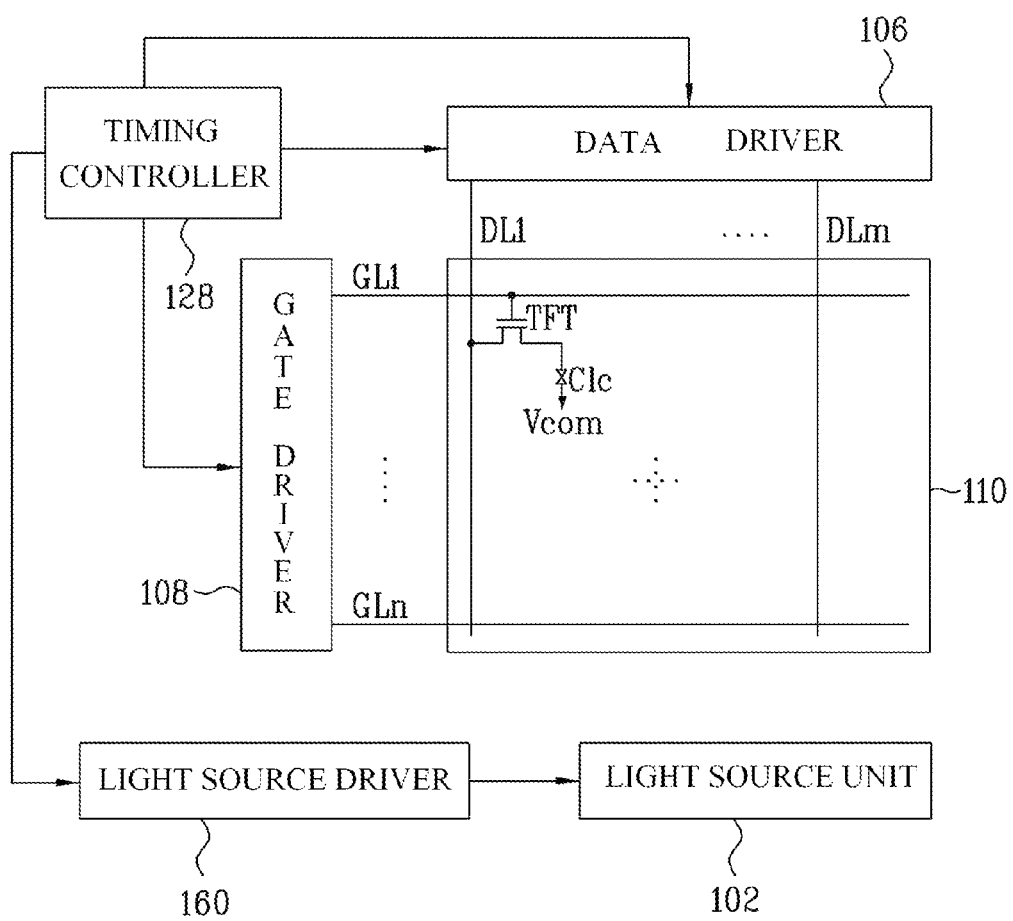
FIG. 1 is a block diagram illustrating a liquid crystal display (LCD) device according to the present invention.

FIG. 1 is a block diagram illustrating a liquid crystal display (LCD) device according to the present invention.

Referring to FIG. 1, the LCD device includes a liquid crystal panel 110 for displaying an image; a gate driver 108 and a data driver 106 for driving the liquid crystal panel 110; a light source unit 102 for illuminating a light beam on the liquid crystal panel 110; a light source driver 160 for driving the light source unit 102; and a timing controller 128 for controlling the gate driver 108, the data driver 106 and the light source driver 160.

The liquid crystal panel 110 includes a liquid crystal cell (Clc) matrix; and a thin film transistor (TFT) connected to the gate line GL and the data line DL so as to drive each liquid crystal (Clc) cell. The TFT of the liquid crystal panel 110 is turned on by a gate ON voltage from the gate line (GL), and a data signal from the data line DL is provided to the liquid crystal (Clc) cell, such that a voltage difference between the common voltage Vcom and the data signal is provided to the liquid crystal (Clc) cell, and the liquid crystal (Clc) cell is turned off by a gate OFF voltage, such that the voltage provided to the liquid crystal cell Clc can be maintained. The liquid crystal (Clc) cell drives a liquid crystal in response to a received voltage, and adjusts a light transmission rate, such that the liquid crystal panel 110 displays an image.

The timing controller 128 generates a plurality of control signals using a plurality of synchronous signals received through a system (not shown), and transmits the generated control signals to the gate driver 108, the data driver 106 and the light source driver 160. The timing controller 128 arranges the data signal received from an external part, and provides the arranged data signal to the data driver 106.

The gate driver 108 sequentially transmits a gate ON voltage to the gate lines GL in response to a control signal from the timing controller 128, and provides a gate ON voltage to the gate lines GL during the remaining time other than the above-mentioned sequential transmission time.

The data driver 106 converts a digital data signal into an analog voltage signal using not only a control signal of the timing controller 128 but also a gamma voltage, and provides the resultant analog voltage to the data line (DL).

Figure 2:
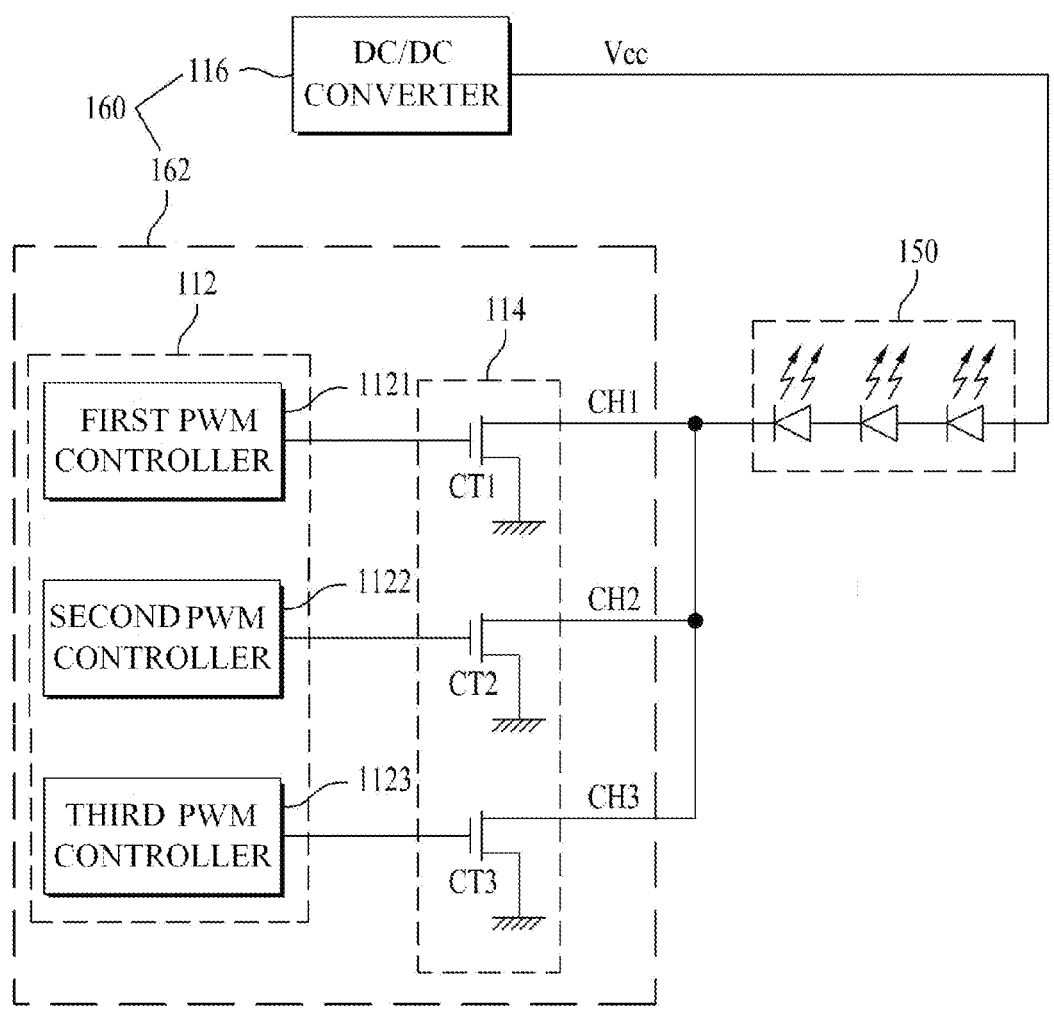
FIG. 2 is a block diagram illustrating a first example of a light source driver shown in FIG. 1 according to the present invention.

The light source unit 102 is driven by the light source driver 160 so as to generate a visible ray or light. The visible ray is illuminated on the liquid crystal panel 110. As shown in FIG. 2, the light source unit 102 is comprised of a plurality of light emitting diode (LED) strings 150 located at a back side or front side of the liquid crystal panel 110. In each LED string 150, a plurality of LEDs may be connected to one another in series or in parallel. In addition, each of the LED strings 150 divides a plurality of channels (CH1, CH2, CH3, . . . ) of an LED driving circuit 162 in units of a predetermined number of channels, such that it is commonly connected in units of the divided channels. Therefore, each of the LED diode string 150 may be commonly connected to the same number of channels (CH1, CH2, CH3, . . . ), or may be commonly connected to different numbers of channels (CH1, CH2, CH3, . . . ).

The light source driver 160 includes an LED driving circuit 162 for driving a plurality of LED strings 150 contained in the light source unit 102; and a DC/DC converter 116.

The DC/DC converter 116 steps up or down an input voltage received from an external part, such that it provides a constant voltage to the LED strings 150. In this case, the DC/DC converter 116 may be located independent of the LED driving circuit 162, or may also be contained in the LED driving circuit 162. In addition, the DC/DC converter 116 may be connected to the LED strings 150 on a one-to-one or one-to-multiple basis.

The LED driving circuit 162 includes a plurality of channels (CH1, CH2, CH3, . . . ) connected to each LED string 150. For example, each LED string 150 may be electrically connected to three channels (CH1, CH2, CH3) as shown in FIG. 2.

The LED driving circuit 162 includes a Pulse Width Modulation (PWM) controller 112 and a current controller 114 so as to individually control the magnitudes of driving current signals applied to the respective LED strings 150.

The PWM controller 112 is electrically connected to the current controller 114, such that it generates a plurality of PWM signals for controlling on/off operations of driving current signals applied to the respective LED strings 150.

The current controller 114 controls the amount of light emitted from the LED strings 150 in response to the PWM signal. For this operation, the current controller 114 includes a plurality of channel switches (CT1, CT2, CT3, . . . ) electrically connected to the LED strings 150 through channels (CH1, CH2, CH3, . . . ). Each gate terminal of the channel switches (CT1, CT2, CT3, . . . ) may be connected to a corresponding PWM controller 112. Source terminals of the channel switches (CT1, CT2, CT3, . . . ) are commonly connected to the LED string 150. For example, a gate terminal of the first channel switch CT1 may be coupled to the first PWM controller 1121, and a source terminal of the first channel switch CT2 may be coupled to the LED string 150 through a first channel CH1. A gate terminal of the second channel switch CT2 may be coupled to a second PWM controller 1122, and a source terminal of the second channel switch CT2 is commonly coupled to the LED string 150 connected to the first channel switch CT1 through a second channel CH2. A gate terminal of a third channel switch CT3 may be coupled to a third PWM controller 1123, and a source terminal of the third channel switch CT3 may be commonly coupled to the LED string 150 connected to the first channel switch CT1 through a third channel CH3.

The channel switches (CT1, CT2, CT3, . . . ) controls on/off operations of the driving current signals in response to the PWM signals from the PWM controller 112. Therefore, the current controller 114 may individually control the magnitudes of the driving current signals applied to the respective LED strings 150.

Figure 3:
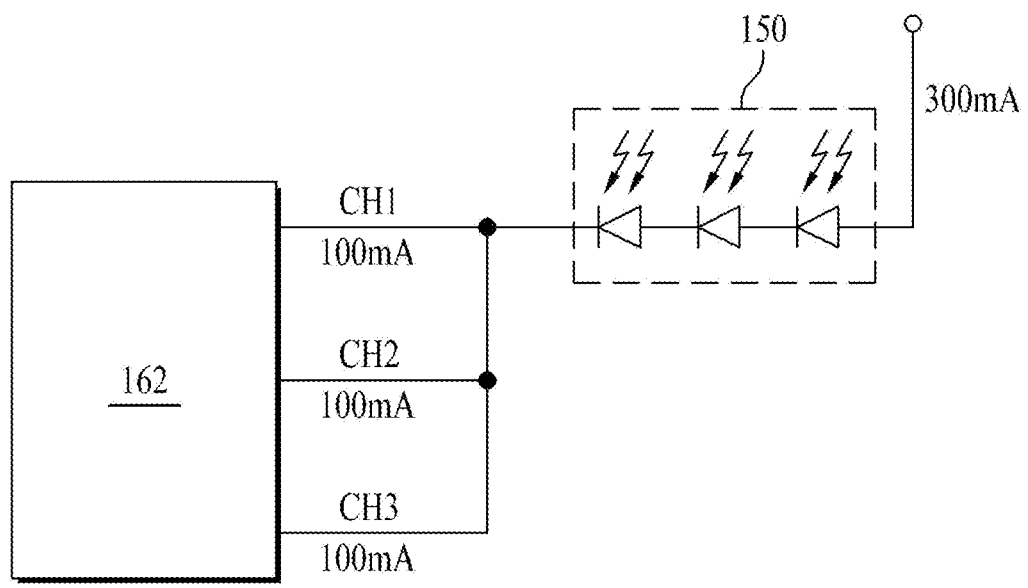
FIG. 3 is a conceptual diagram illustrating a method for driving a light source driver shown in FIG. 2.

Likewise, several channels (CH1, CH2, CH3, . . . ) of the LED driving circuit 162 are commonly coupled to the same LED string 150, such that the respective LED strings 150 are driven in parallel through several channels (CH1, CH2, CH3, . . . ) of the LED driving circuit 162. Therefore, each LED string 150 can be driven by the sum of respective maximum allowable current signals of the channels (CH1, CH2, CH3, . . . ) of the LED driving circuit 162 connected to the corresponding LED string. That is, each LED string 150 can be driven by more than a maximum allowable current signal of each of the channels (CH1, CH2, CH3, . . . ) of the LED driving circuit 162. For example, if a maximum current signal of each of the channels (CH1, CH2, CH3, . . . ) of the LED driving circuit 162 is 100 mA as shown in FIG. 3, three channels (CH1, CH2, CH3) of the LED driving circuit 162 are connected in parallel to the LED string 150, such that the LED string 150 can be driven at 300 mA.

Therefore, it is not necessary to modify the LED driving circuit 162 in response to the allowable current signal of the LED string 150. In addition, the LED driving circuit 162 having a plurality of channels (CH1, CH2, CH3, . . . ), each of which has a maximum allowable current of a low value, can drive the LED string 150 which has a maximum allowable current value higher than a maximum allowable current of each channel, such that the LED driving circuit 162 having a general purpose can be implemented. In addition, production costs can be reduced by implementation of the general-purpose LED driving circuit 162.

Figure 4:
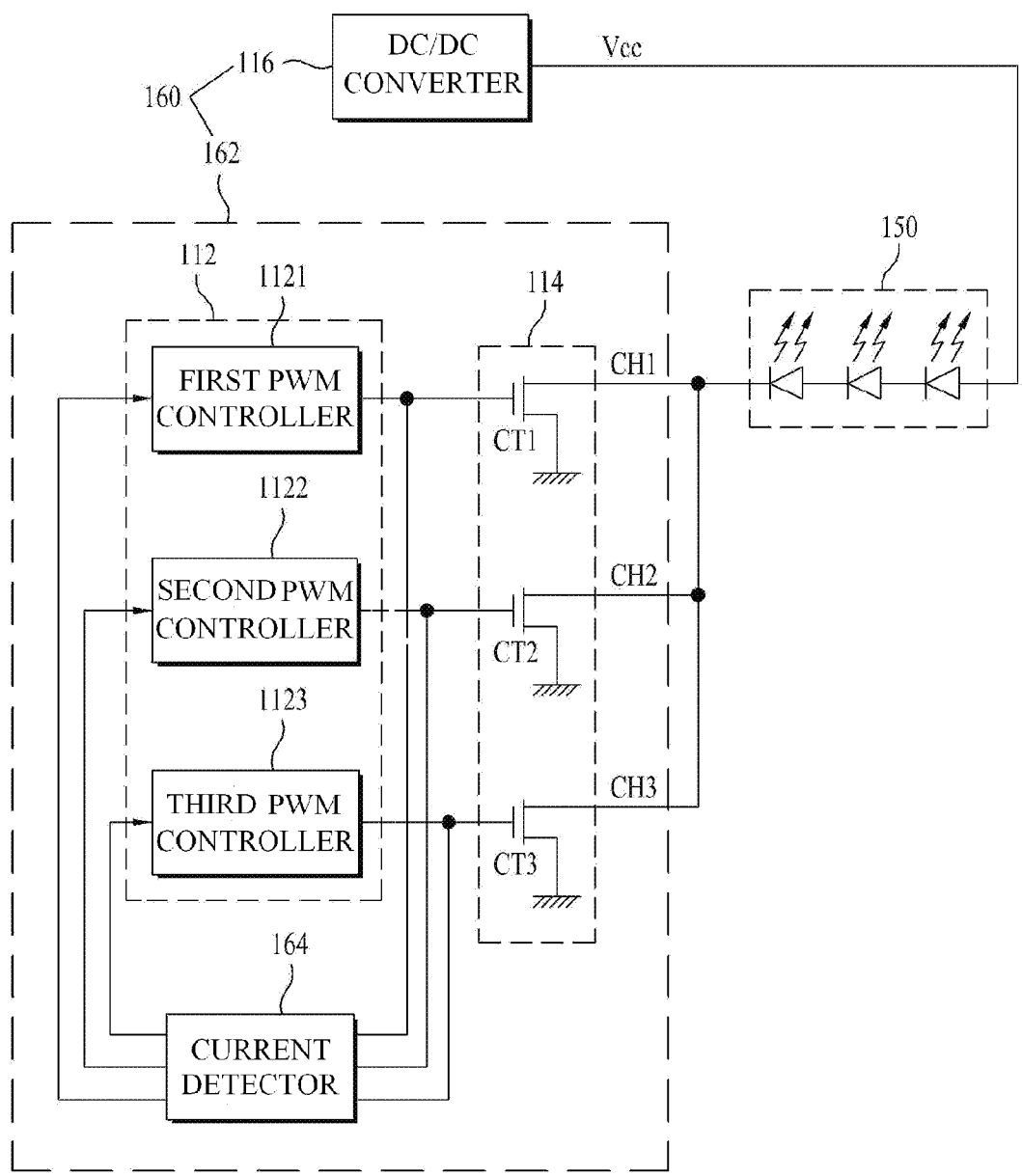
FIG. 4 is a block diagram illustrating a second example of a light source driver shown in FIG. 1 according to the present invention.

FIG. 4 is a circuit diagram illustrating an LED driving circuit according to a second embodiment of the present invention.

In contrast to the LED driving circuit of FIG. 2, the LED driving circuit of FIG. 4 further includes the current detector 164, but the remaining components other than the current detector 164 are identical to those of FIG. 2, and as such a detailed description thereof will be omitted herein for convenience of description.

The current detector 164 detects current signals of the PWM signals provided to the channel switches (CT1, CT2, CT3, . . . ) of the current controller 114 connected to the same LED string 150, and compares the detected current signals with one another, such that it compensates the resultant current signals in such a manner that the PWM signals provided to respective channels are to be identical. In more detail, the current detector 164 compares the current values of the PWM signals provided to the first to third channel switches (CT1, CT2, CT3) connected to the same LED string 150 using a comparator (not shown). According to the result of comparison, in the case where at least one of the PWM signals provided to the first to third channel switches (CT1, CT2, CT3) is different from the remaining ones, the current detector 164 enables the first to third PWM controllers 1121, 1122 and 1123 to compensate the PWM signals provided to the first to third channel switches (CT1, CT2, CT3) in such a manner that the PWM signals have the same current value.

As described above, the current detector 164 compensates current values of the PWM signals provided to several channel switches CT of the current controller 114 connected to the same LED string 150, such that the PWM signals have the same current value, resulting in increased accuracy of current control. In addition, several channels CH are connected in parallel to the same LED string 150, such that it is not necessary to modify the LED driving circuit 162 in response to the allowable current of the LED string 150. Moreover, the LED driving circuit 162 having a plurality of channels (CH1, CH2, CH3, . . . ), each of which has a maximum allowable current of a low value, can drive the LED string 150 which has a maximum allowable current value higher than a maximum allowable current of each channel, such that a general-purpose LED driving circuit 162 can be implemented.

Figure 5:
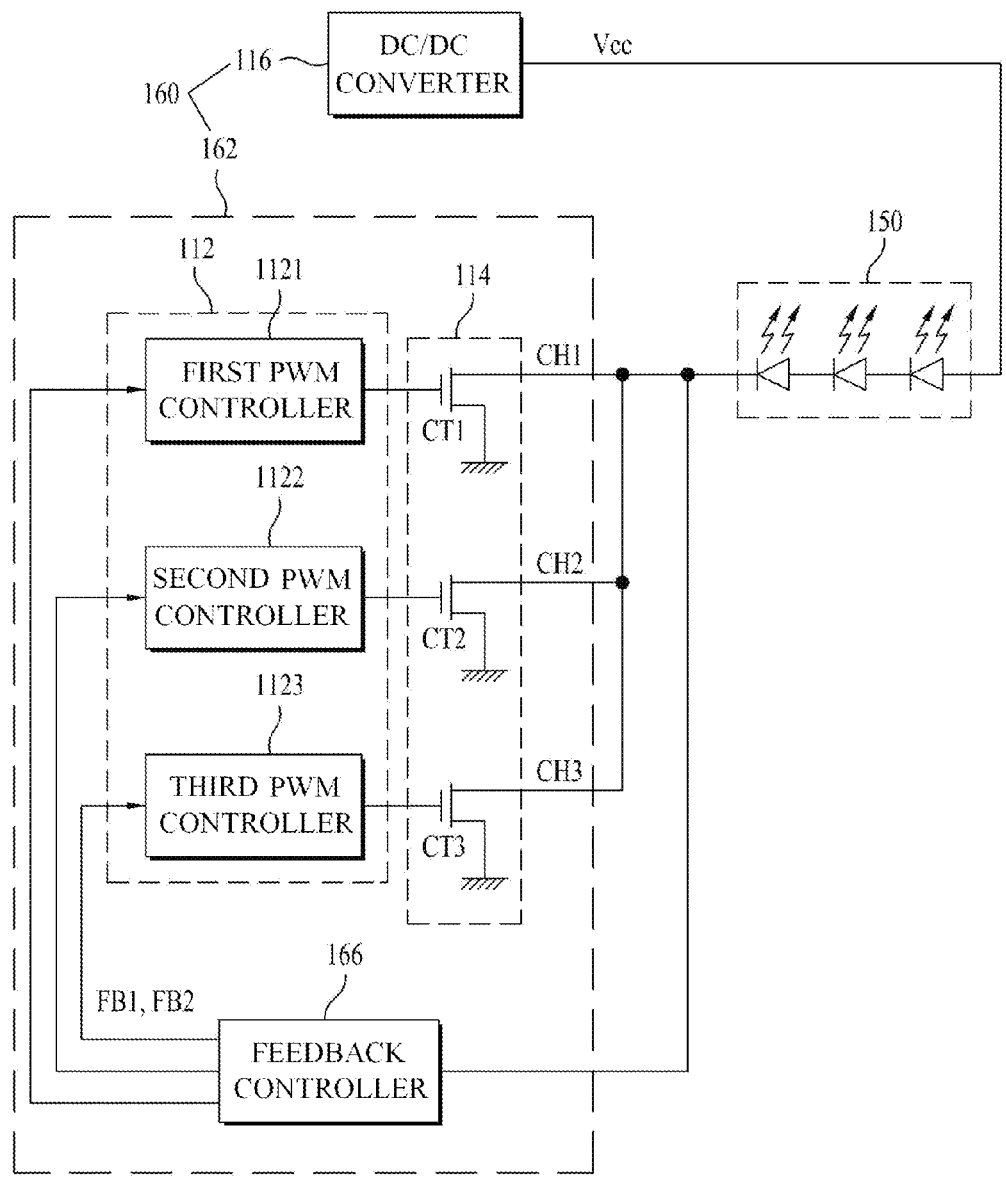
FIG. 5 is a block diagram illustrating a third example of a light source driver shown in FIG. 1 according to the present invention.

FIG. 5 is a detailed circuit diagram illustrating an LED driving circuit according to a third embodiment of the present invention.

In contrast to the LED driving circuit of FIG. 2, the LED driving circuit of FIG. 5 further includes a feedback controller 166, but the remaining components other than the feedback controller 166 are identical to those of FIG. 2, and as such a detailed description thereof will be omitted herein for convenience of description.

The feedback controller 166 detects an output current of the LED string 150, such that it generates a first or second feedback signal FB1 or FB2 corresponding to the detected output current. In other words, the feedback controller 166 generates the first feedback signal FB1 when an output current of the LED string 150 is equal to or less than a maximum allowable current of each of the channels (CH1, CH2, CH3, In contrast, the feedback controller 166 generates the second feedback control signal FB2 when an output current of the LED string 150 is higher than the maximum allowable current of each of the channels (CH1, CH2, CH3, . . . ).

Figure 6A:
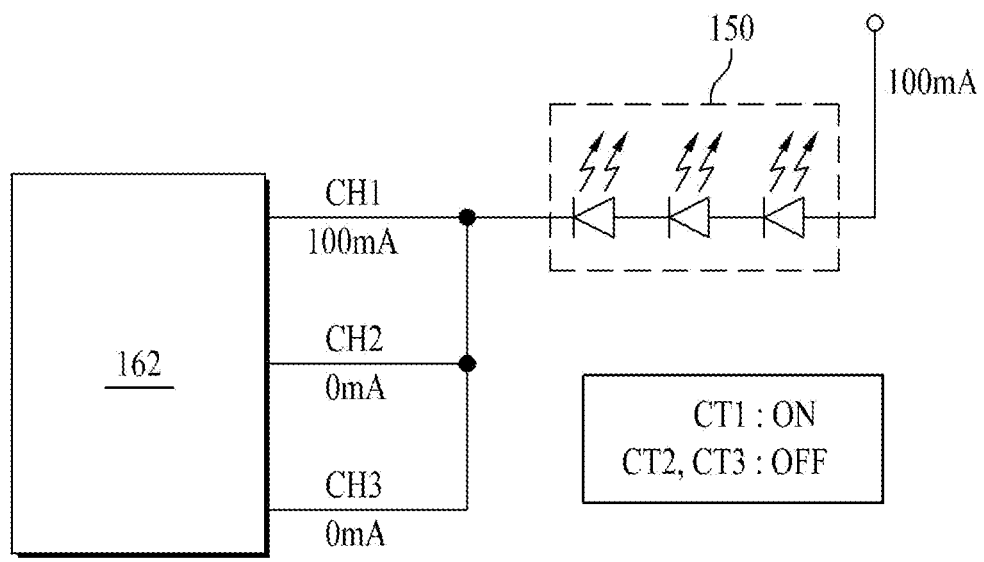
FIGS. 6A and 6B are conceptual diagrams illustrating a method for driving a light source driver shown in FIG. 5 according to the present invention.
Figure 6B:
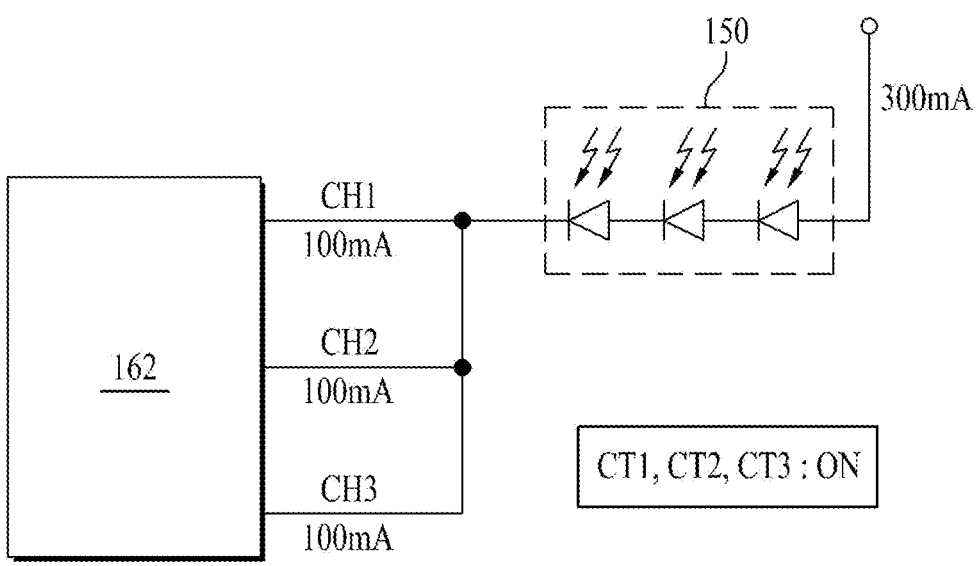

The PWM controller 112 controls a duty ratio of each of channel switches (CT1, CT2, CT3, . . . ) of the current controller 114 in response to the first and second feedback signals FB1 and FB2, such that it adjusts an amount of a current provided to the LED string 150. In other words, the PWM controller 112 controls the duty ratios of the first to third channel switches CT1, CT2 and CT3 of the current controller 114 in response to the first feedback signal FB1, such that the sum of maximum allowable currents of respective channels connected to the same LED string 150 is identical to an output current of the LED string 150 and is less than a maximum allowable current of each channel CH. The first to third PWM controllers 1121, 1122 and 1123 controls the duty ratios of the first to third channel switches CT1, CT2 and CT3 of the current controller 114 in response to the second feedback signal FB2, such that the sum of maximum allowable currents of respective channels connected to the same LED string 150 is identical to an output current of the LED string 150. For example, as shown in FIG. 6A, in the case where the feedback controller 166 detects a current provided through the LED string 150 as a maximum current (100 mA) of each channel CH, the feedback controller 166 provides the first feedback signal FB1 to the first to third PWM controllers 1121, 1122 and 1123. The first to third PWM controllers 1121, 1122 and 1123 control duty ratios of the first to third channel switches CT1, CT2 and CT3 in response to the first feedback signal FB1, such that the first to third PWM controllers 1121, 1122 and 1123 may correspond to the maximum current value of 100 mA. Therefore, the first channel switch CT1 of the current controller 114 is turned on, and the second and third channel switches CT2 and CT3 are turned off. As shown in FIG. 6B, in the case where the feedback controller 166 detects a current provided through the LED string 150 as a current value of 300 mA higher than a maximum current of each channel CH, the feedback controller 166 provides the second feedback signal FB2 to the first to third PWM controllers 1121, 1122 and 1123. The first to third PWM controllers 1121, 1122 and 1123 control duty ratios of the first to third channel switches CT1, CT2 and CT3 in response to the second feedback signal FB2, such that the first to third PWM controllers 1121, 1122 and 1123 may correspond to the current value of 300 mA. Therefore, the first to third channel switches CT1, CT2 and CT3 of the current controller 114 are turned on.

As apparent from the above description, in accordance with the above-mentioned light source driving apparatus and the method for driving the same, a plurality of channels of a light-emitting driving circuit are coupled in parallel to the same light emitting diode string, such that the light source driving apparatus need not modify a light-emitting driving circuit in response to an allowable current of the light-emitting diode string. In addition, the above-mentioned apparatus or method can drive a light emitting diode (LED) string, which has a maximum allowable current value higher than that of a channel, using the light-emitting driving circuit which includes a plurality of channels, each of which has a maximum allowable current corresponding to a low current, such that a general-purpose light-emitting driving circuit can be implemented, resulting in reduction in production costs due to the implementation of the general-purpose light-emitting driving circuit.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. An apparatus for driving a light source, comprising:
a plurality of light emitting diode (LED) strings; and
a light emitting diode (LED) driving circuit configured to drive the LED strings, and comprising a plurality of channels commonly connected to the same LED string, wherein the LED driving circuit comprises:
a pulse controller configured to generate a pulse signal to control luminosity of each of the LED strings,
a current controller comprising a plurality of channel switches configured to control a magnitude of a current signal provided to each of the LED strings in response to the pulse signal, and
a current detector located between the pulse controller and the current controller, the current detector configured to:
detect current values of pulse signals provided to the channel switches, and
compare the detected current values with one another, and
wherein the pulse controller is further configured to control duty ratios of the channel switches when the current values detected by the current detector is different from one another, such that the pulse signals provided to the channel switches connected to the LED string have a same current value.

2. The apparatus according to claim 1, wherein the LED driving circuit further comprises a feedback controller for configured to:
detect an output current of the LED string;
generate a first feedback control signal when the detected output current is equal to or less than a maximum allowable current of each channel; and
generate a second feedback control signal when the detected output current is higher than the maximum allowable current of each channel.

3. The apparatus according to claim 2, wherein the pulse controller is further configured to control a duty ratio of the channel switch in response to the first and second feedback control signals, such that the sum of maximum allowable currents of respective channels is identical to the detected current.

4. A method for driving a light source, the method comprising:
commonly connecting a plurality of channels of a light emitting diode (LED) driving circuit to each of light emitting diode (LED) strings; and
driving the LED strings using the LED driving circuit, wherein the driving of the LED strings comprises:
generating, by a pulse controller, a pulse signal for controlling luminosity of each LED string,
controlling, by a current controller comprised of a plurality of channel switches, a magnitude of a current provided to the LED strings in response to the pulse signal,
detecting, by a current detector located between the pulse controller and the current controller, current values of pulse signals provided to the respective channel switches,
comparing the detected current values with one another, and
controlling duty ratios of the channel switches when the current values detected by the current detector are different from one another, such that the pulse signals provided to the channel switches connected to the LED string have a same current value.

5. The method according to claim 4, further comprising:
detecting an output current of the LED string;
generating a first feedback control signal when the detected output current is equal to or less than a maximum allowable current of each channel;
generating a second feedback control signal when the detected output current is higher than the maximum allowable current of each channel; and
controlling duty ratios of the channel switches in response to the first and second feedback control signals, such that the sum of maximum allowable currents of respective channels is identical to the detected current.

* * * * *